United States Patent [19]
Schmidt-Hebbel

[11] Patent Number: 5,093,548
[45] Date of Patent: Mar. 3, 1992

[54] METHOD OF FORMING HIGH PRECISION THROUGH HOLES IN WORKPIECES WITH A LASER BEAM

[75] Inventor: Robert Schmidt-Hebbel, Erlangen, Fed. Rep. of Germany

[73] Assignee: Robert Bosch GmbH, Stuttgart, Fed. Rep. of Germany

[21] Appl. No.: 599,680

[22] Filed: Oct. 17, 1990

[30] Foreign Application Priority Data

Oct. 17, 1989 [DE] Fed. Rep. of Germany ....... 3934587

[51] Int. Cl.⁵ ............................................. B23K 26/00
[52] U.S. Cl. .............................. 219/121.71; 219/121.7; 219/121.69
[58] Field of Search ........... 219/121.69, 121.7, 121.71, 219/121.78, 121.79, 121.74, 121.75

[56] References Cited

U.S. PATENT DOCUMENTS

| | | | |
|---|---|---|---|
| 3,833,786 | 9/1974 | Brucker | 219/121.7 |
| 4,181,051 | 1/1980 | Drori | 219/121.71 X |
| 4,932,112 | 6/1990 | Tikkanen | 219/121.71 X |

FOREIGN PATENT DOCUMENTS

0154282  6/1988  Japan .............................. 219/121.71

Primary Examiner—C. L. Albritton
Attorney, Agent, or Firm—Michael J. Striker

[57] ABSTRACT

A method of forming a high precision through hole in a workpiece with a laser beam consists in forming a through hole having a hole section with a diameter equal to a nominal diameter of the through hole, and a hole section with a diameter which is bigger than the nominal diameter of the through hole.

6 Claims, 1 Drawing Sheet

METHOD OF FORMING HIGH PRECISION THROUGH HOLES IN WORKPIECES WITH A LASER BEAM

BACKGROUND OF THE INVENTION

The invention relates to a method of forming high precision through holes in workpieces with a laser beam. In particular, the invention relates to forming injection holes in fuel injection nozzles. European patent EP-A 02 99 143 discloses a method of and apparatus for producing hole having a small diameter in injection nozzles. According to the method disclosed in EP-A 02 99 143, initially a hole with a diameter which is less than the nominal diameter of the injection hole is formed with laser beam. Then, the smaller diameter hole is brought to the nominal diameter by using an electrical discharge drilling. To this end, a wire electrode is inserted into the smaller diameter hole and brings the hole diameter to a predetermined value by removing the material with spark erosion. An annular space between the outer diameter of the electrode and the hole wall is flushed with an electrolyte that carries away the eroded material particles. Thereby a smooth high precision cylindrical hole is produced. However, with this method, the hole wall must be sufficiently thick to be able to withstand loads acting thereon, i.e., pressure.

SUMMARY OF THE INVENTION

The object of the invention is to simplify the manufacturing process of forming small diameter through holes in workpieces such as injection nozzles. The object of the invention is achieved with a method according to which a through hole is formed with a laser beam in a single operation. According to the method of the invention, a through hole is formed that has a nominal diameter hole section and a hole section having a diameter bigger than the nominal diameter. The method of the invention permits to obtain high precision through holes in workpieces having a relatively large wall thickness. The precision of through holes obtained by the inventive method is higher than the precision of through holes obtained according to the prior art method when the hole has the same diameter through its entire extent. The high precision results from the fact that the length of the discharge section of the through hole occupies only a portion of the wall thickness of the workpiece. The reduced length of the discharge nominal diameter hole section permits to reduce deviations of the hole from nominal shape and diameter caused by the geometry of the laser beam, to a minimum.

According to one embodiment of the method of the invention, a blind bore having the bigger diameter is formed in a portion of the workpiece during a first operational phase, and a nominal diameter through hole next to the blind bore is formed in a remaining portion of the workpiece during a second operational phase. Alternatively, a nominal diameter blind bore may be formed in a portion of the workpiece during a first operational phase, and a bigger diameter through hole next to the blind hole in a remaining portion of the workpiece may be formed during a second operational phase. The two hole sections may be formed as from one side of the workpiece to from opposite sides. To this end, two laser units may be used.

The laser beams used for forming the through holes are subdivided into a plurality of hole-forming rays having different focal points and generating angles. The hole-forming rays comprise first and second rays for forming the bigger diameter hole section and the nominal diameter hole section, respectively, and having a different local and temporal energy level, respectively. The hole-forming ray for forming the bigger diameter hole section has a higher ray power than the hole-forming ray for forming the nominal diameter hole section.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENT

Figure 1:
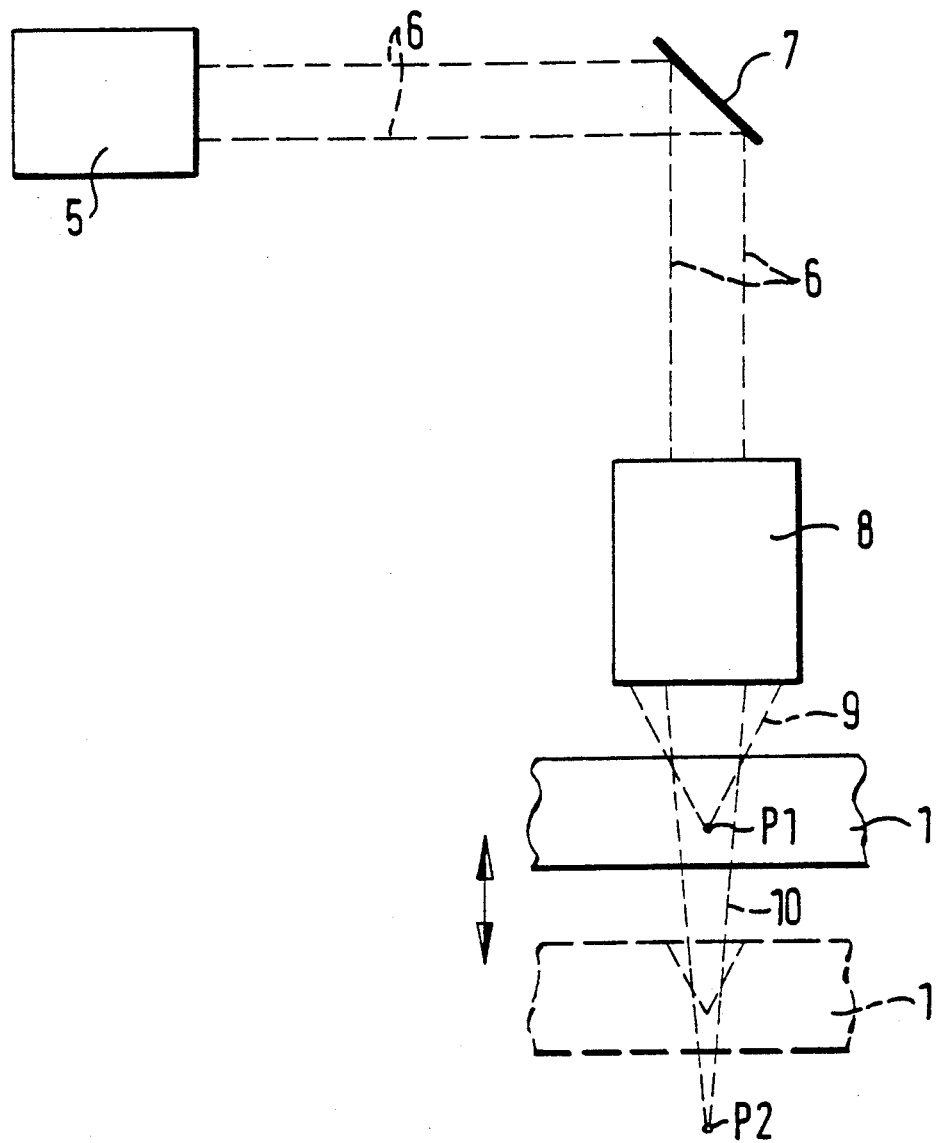
FIG. 1 shows a schematic view of an apparatus for manufacturing through holes in accordance with the method of the invention.
Figure 2:
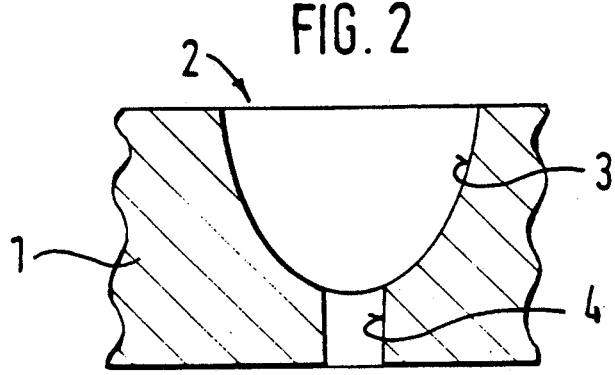
FIG. 2 shows an enlarged partial cross-sectional view of a workpiece having holes produced in accordance with the method of the invention.

FIG. 1 shows a schematic view of an apparatus for forming through holes 2 in a wall 1 of a workpiece, in particular of a fuel injection nozzle. The workpieces are held in a predetermined position by appropriate holding means (not shown). The through hole 2 consists of two coaxial adjacent portions 3 and 4. The hole portion or section 3 is formed as a blind bore section having a diameter larger than the diameter of the adjacent hole section 4 that has a cylindrical or a substantially cylindrical shape and the diameter of which is the predetermined nominal diameter of the hole. The holes 2 are produced with laser rays emitted from a laser 5. As shown in FIG. 1, a cylindrical beam of rays 6 falls on a mirror 7 that deflects the rays 6 in the direction of the wall 1 of the workpiece. The deflection angle is 90° in the disclosed embodiment. The laser rays may be directed at another angle or without a mirror directly onto the workpiece wall 1. As shown in FIG. 1, the rays emitted from the laser 5 are directed to the wall 1 of the workpiece through an adjustable lens system arranged between the mirror 7 and the wall 1. The rays directed from the lens system 8, include ray 9 having a bigger generating angle and ray 10 with a smaller generating angle which focal points are designated with $P_1$ and $P_2$, respectively. The focal point $P_1$ of the first ray 9 lies inside the wall below the deepest position of the blind bore section 3. The focal point $P_2$ of the second ray 10 lies outside of the wall 1 to insure that the hole section 4 defining the nominal diameter has a form that is as close to a cylindrical form as practically possible. Generally, the positions of the focal points depend on the type of the workpiece and the desired form of the hole and its diameter and are determined empirically.

The holes 2 may be formed as follows. In the first phase, the blind bore section 3 is formed with ray 9 by one or several impulses with predetermined energy distribution. The wall 1 of the workpiece is arranged beneath the lens system 8. In the second phase, upon appropriate adjustment of the lens system 8, the second hole section 3 with nominal diameter of the hole is formed with the ray 10. The workpiece wall 1 is displaced in the direction of the optical axis of the lens system 8 into a position shown in FIG. 1 with dotted line. The ray power of the hole-forming rays 9, 10 and as well as the number of required laser impulses necessary for forming of hole sections 3 and 4 is pre-selectable in dependence on the type of the workpiece and the thickness of the wall 1, on the laser 5. It is also possible to interrogate the parameters necessary for laser control directly at the workpiece during manufacturing and feed them into the laser control.

According to another embodiment, the hole 2 may be produced from opposite sides of the wall 1. To this end either two laser units may be used, or the hole sections 3 and 4 are formed by using a single laser aggregate with corresponding deflection of the rays, or direction of them to top and bottom of the wall 1. The blind bore section 3 at that is preferably formed by using ray deflectors and light leader cable (i.e., with Nd:YAG laser radiation), and the nominal diameter hole section 4 is formed by using a special lens optical system.

Also, a reverse manufacturing process is possible. First, a blind hole with a nominal diameter is produced. Then, a hole with a bigger diameter which is adjacent to and passes into the nominal diameter blind hole, is formed from the opposite side of the wall. During the second step, the first hole section is in a known manner, i.e., with buffer gas, protected from melting and material precipitation. A point in favor of this embodiment is that laser-bored blind bores have a higher degree of accuracy than laser-bored through bores.

It is contemplated, that the positions of focal points $P_1$ and $P_2$, during the manufacturing process, can be continuously varied within predetermined limits by adjusting the lens system 8 and/or by displacement of the wall 1 in the direction of double arrow shown in FIG. 1 to obtain a desired contour of the through bore.

The length of the nominal diameter hole section 4 should be such that the directional effect of the hole for fuel injection is maintained. In conventional injection nozzles, this length is equal approximately to one third of the wall thickness.

While the invention has been illustrated and described as embodied in a method of manufacturing through holes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of forming a high precision through hole in a workpiece with a laser beam, comprising the step of forming a through hole having a hole section with a diameter equal to a nominal diameter of the through hole; and increasing the precision of said hole section by reducing deviations of said hole section from a nominal diameter caused by a geometry of the laser beam, by forming in the through hole a hole section with a diameter which is bigger than the nominal diameter of the through hole, said forming and increasing including using a laser beam adapted to be subdivided into a plurality of hole-forming rays having at least one of different focal points and generating angles, said plurality of hole-forming rays comprising first and second rays for forming the big diameter hole section and the nominal diameter hole section, respectively, and having a different local and temporal energy level respectively.

2. A method of forming a high precision through hole in a workpiece with a laser beam, comprising the step of forming a through hole having a hole section with a diameter equal to a nominal diameter of the through hole, and increasing the precision of said hole section by reducing deviations of said hole section from a nominal diameter caused by a geometry of the laser beam, by forming in the through hole a hole section with a diameter which is bigger than the nominal diameter of the through hole, said forming including forming a blind bore having the bigger diameter in a portion of the workpiece during a first operational phase, and forming a nominal diameter through hole next to the blind bore in a remaining portion of the workpiece during a second operational phase.

3. A method of forming a high precision through hole in a workpiece with a laser beam, comprising the step of forming a through hole having a hole section with a diameter equal to a nominal diameter of the through hole, and increasing the precision of said hole section by reducing deviations of said hole section from a nominal diameter caused by a geometry of the laser beam, by forming in the through hole a hole section with a diameter which is bigger than the nominal diameter of the through hole, said forming including forming a nominal diameter blind bore in a portion of the workpiece during a first operational phase, and forming a bigger diameter through hole next to the blind hole in a remaining portion of the workpiece during a second operational phase.

4. A method of forming a high precision through hole in a workpiece with a laser beam, comprising the step of forming a through hole having a hole section with a diameter equal to a nominal diameter of the through hole, and increasing the precision of said hole section by reducing deviations of said hole section from a nominal diameter caused by a geometry of the laser beam, by forming in the through hole a hole section with a diameter which is bigger than the nominal diameter of the through hole, the nominal diameter of hole section and the bigger diameter hole section being formed from opposite sides of the workpiece, respectively.

5. A method of forming a high precision through hole in a workpiece with a laser beam, comprising the step of forming a through hole having a hole section with a diameter equal to a nominal diameter of the through hole, and increasing the precision of said hole section by reducing deviations of said hole section from a nominal diameter caused by a geometry of the laser beam, by forming in the through hole a hole section with a diameter which is bigger than the nominal diameter of the through hole, said forming including using a laser beam adapted to be subdivided into a plurality of hole-forming rays having at least one of different focal points and generating angles.

6. A method as set forth in claim 5 wherein the nominal diameter hole section and the bigger diameter hole section are formed from one side of the workpiece.

* * * * *